A. B. HOFFMEYER & J. SCHMIDT.
Rotary-Plows.

No. 145,177.  Patented Dec. 2, 1873.

Witnesses.
A. Ruppert.
N. Bradford.

A. B. Hoffmeyer
J. Schmidt.
Inventors

UNITED STATES PATENT OFFICE.

ANDREAS B. HOFFMEYER AND JAMES SCHMIDT, OF COPENHAGEN, DENMARK.

IMPROVEMENT IN ROTARY PLOWS.

Specification forming part of Letters Patent No. 145,177, dated December 2, 1873; application filed November 20, 1873.

*To all whom it may concern:*

Be it known that we, ANDREAS B. HOFFMEYER and JAMES SCHMIDT, residing at Copenhagen, in the Kingdom of Denmark, have invented a certain Improvement in Plows, of which the following is a specification:

This invention relates to that class of plows in which one or more shares fixed to a revolving shell or disk scoop up slices of the surface-soil, and, after carrying the same around with them, deposit the slices in the rear, bottom-side up. Our improvement consists in the combination with such a plow, in which the shares are rigidly fixed to a revolving disk, of rotary cutters or knives operating in advance of the revolving shares to cut the soil into narrow strips to facilitate the action of the shares, as well as to aid in the pulverization of the soil, and a deflector standing upon the land side of the shares to secure the deposition of the upturned slices of soil upon the furrow side.

Figure 1:
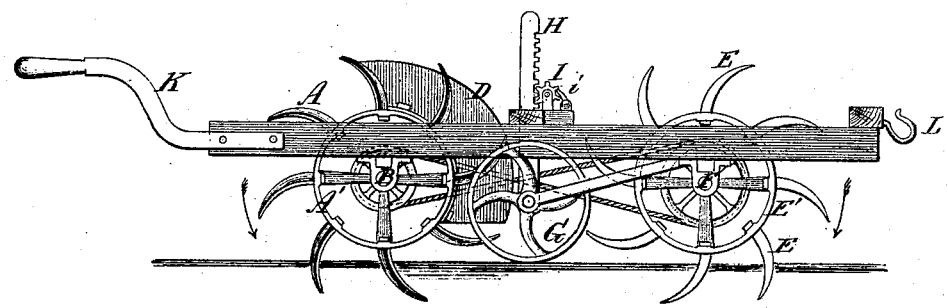
Figure 2:
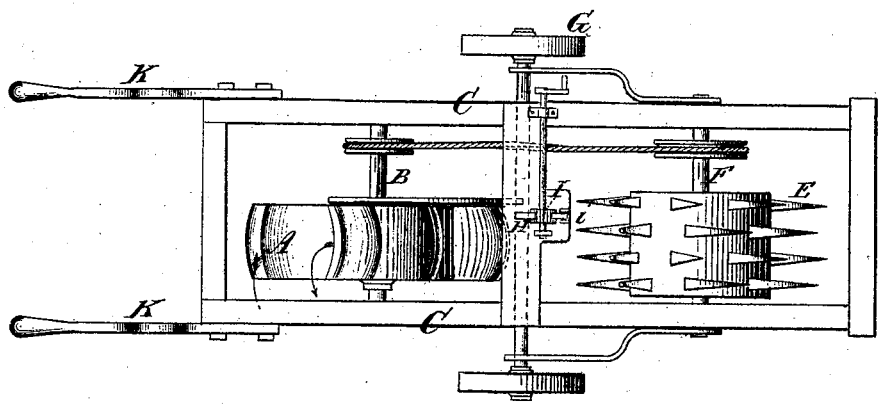

Figure 1 is a side elevation of our improved plow. Fig. 2 is a plan view thereof.

The same letters of reference are used in both figures in the designation of identical parts.

The shares or spades A are curved, as shown in the drawings, and are secured either to the surface of a cylinder, or to disks A', which are in turn firmly secured to a horizontal shaft or axle, B, which is sustained and revolves in suitable bearings on the frame C. The spading-shares are made of proper width, and, being rotated in manner hereafter described, successively scoop up portions of the surface-soil, carry it upward, and, in finally discharging it in the rear, leave it turned bottom-side up. A shield or deflector, D, is arranged upon the machine in close proximity to the sides of the spades adjacent to the land side, by means of which the slices of soil turned up by the spades are properly directed for deposition upon the furrow side. The soil, preparatory to being subjected to the action of the spading-shares A, is cut into narrow strips by means of a series of revolving cutters, E, which are carried on a cylinder or disks, E', keyed to the shaft or axle F, which revolves in bearings secured to the side timbers near the forward end of the frame. The cutters and spades are made to revolve in opposite directions, the former being the drivers, as shown. This may be accomplished by means of pulleys and a crossed belt, a lever, connecting-rods and cranks, or in any other preferred manner. The surface-soil being thus cut into narrow strips greatly facilitates the operation of the spades; besides, the soil will be pulverized to a greater extent, so that one treatment by a harrow will be quite sufficient. Another important advantage resulting therefrom is, that the earth, being thus crumbled, is more open to the action of the air in being carried through it by the revolving spades. The frame is mounted upon a truck, G, and is made vertically adjustable, to regulate the depth of the cut of the knives and spades, by means of a vertical rack, H, secured to the axle of the truck, and a pinion, I, on the frame. A pawl, *i*, falls into the pinion, to hold the frame and its adjuncts at any elevation to which it may be raised.

The plow is guided by means of handles K on its rear end, and the draft is applied at the clevis L.

What we claim as our invention, and desire to secure by Letters Patent, is—

The combination of the revolving cutters E, revolving shares A, and stationary shield or deflector D, all arranged and operating substantially as and for the purpose specified.

A. B. HOFFMEYER.
                JAMES SCHMIDT.

Witnesses:
    AUTMAN STEINBERG,
    THEODOR E. PETERSEN.